United States Patent
Kim et al.

(10) Patent No.: US 9,817,175 B2
(45) Date of Patent: Nov. 14, 2017

(54) LIGHT GUIDE PLATE HAVING ROUNDED POLYGON PATTERN AND LIQUID CRYSTAL DISPLAY DEVICE HAVING THEREOF

(71) Applicant: LG DISPLAY CO., LTD., Seoul (KR)

(72) Inventors: Dong Yul Kim, Suwon-si (KR); JongHyeok Kim, Gumi-si (KR); JiHo Son, Gwangju (KR); JungHun Chang, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/291,357

(22) Filed: May 30, 2014

(65) Prior Publication Data

US 2014/0354919 A1  Dec. 4, 2014

(30) Foreign Application Priority Data

May 31, 2013  (KR) .................. 10-2013-0062913

(51) Int. Cl.
*F21V 8/00* (2006.01)
*G02F 1/1335* (2006.01)

(52) U.S. Cl.
CPC ..... *G02B 6/0036* (2013.01); *G02F 1/133605* (2013.01)

(58) Field of Classification Search
CPC .... G02B 6/0036; G02B 6/0088; G02B 6/005; G02B 6/0068; G02B 6/0073; G02B 6/0083; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 21/0032; G02B 21/06; G02B 21/16; G02B 6/0033; G02B 6/0035; G02B 6/0038; G02B 6/004; G02B 6/0041; G02B 6/0043; G02B 6/0045; G02B 6/0046; G02B 6/0048; G02B 6/0051; G02B 6/0053; G02B 6/0055; G02B 6/0056; G02B 6/0058; G02B 6/006; G02B 6/0061; G02B 6/0063; G02B 6/0065; G02B 6/0066; G02B 6/007; G02B 6/0071; G02B 6/0075; G02B 6/0076; G02B 6/0078; G02B 6/008;

(Continued)

(56) References Cited

U.S. PATENT DOCUMENTS 6,130,730 A * 10/2000 Jannson ............... G02B 6/0038
                                                        349/64
6,712,481 B2 *  3/2004 Parker ................... F21V 5/00
                                                        362/330

(Continued)

FOREIGN PATENT DOCUMENTS

CN  100445824 C  12/2008
CN  101324681 A  12/2008

(Continued)

*Primary Examiner* — Edward Glick
*Assistant Examiner* — Shan Liu
(74) *Attorney, Agent, or Firm* — Dentons US LLP

(57) ABSTRACT

Provided is a light guide plate including: a main body for guiding incident light and transmitting the incident light from an upper surface of the main body; and a plurality of light converging patterns in a rounded wedge shape having a rounded upper surface on a lower surface of the main body to converge and reflect the incident light in a predetermined direction.

12 Claims, 10 Drawing Sheets

(58) Field of Classification Search
CPC .......... G02B 6/10; G02B 6/102; G02B 6/105;
G02B 6/107; G02B 6/122; G02B 6/1221;
G02B 6/1226; G02B 6/1225; G02B
2006/12083; G02B 2006/12085; G02B
2006/12088; G02B 2006/1209; G02B
2006/12092; G02B 2006/12095; G02B
6/1223; G02F 1/133605; G02F 1/1336;
G02F 2001/133607; G02F 2001/133616;
G02F 1/133606; G02F 1/133504; G02F
1/133615; G02F 1/133308; G02F
2001/133317; G02F 2001/133322; G01N
21/62; G01N 21/6458; B82Y 20/00
USPC ....................................................... 359/385
See application file for complete search history.

(56) References Cited

U.S. PATENT DOCUMENTS

| 2002/0061178 | A1* | 5/2002 | Winston | F21V 5/02 385/133 |
|---|---|---|---|---|
| 2006/0198598 | A1* | 9/2006 | Fang | G02B 6/0036 385/146 |
| 2006/0250817 | A1* | 11/2006 | Yamashita | G02B 5/045 362/606 |
| 2007/0103938 | A1* | 5/2007 | Chang | G02B 6/0036 362/617 |
| 2008/0008434 | A1* | 1/2008 | Lee | G02B 6/0036 385/129 |
| 2008/0138024 | A1* | 6/2008 | Parker | F21V 5/00 385/130 |
| 2011/0228558 | A1* | 9/2011 | Uchida | G02B 6/0055 362/607 |
| 2012/0275190 | A1* | 11/2012 | Matsumoto | G02B 6/0036 362/609 |
| 2013/0286679 | A1* | 10/2013 | Chen | G02B 6/0053 362/607 |
| 2014/0177277 | A1* | 6/2014 | Wang He | G02F 1/133604 362/619 |

FOREIGN PATENT DOCUMENTS

| CN | 101755167 A | 6/2010 |
|---|---|---|
| CN | 102227587 A | 10/2011 |
| TW | 200632446 A | 9/2006 |

* cited by examiner

LIGHT GUIDE PLATE HAVING ROUNDED POLYGON PATTERN AND LIQUID CRYSTAL DISPLAY DEVICE HAVING THEREOF

CROSS-REFERENCE TO RELATED APPLICATION

This application claims the benefit of Korean Patent Application No. 10-2013-0062913, filed on May 31, 2013, the contents of which are incorporated by reference for all purposes as if set forth herein.

BACKGROUND OF THE INVENTION

1. Field of the Invention

The present invention relates to a light guide plate and a liquid crystal display device equipped with the light guide plate. More particularly, the present invention relates to a light guide plate capable of improving optical efficiency and preventing defects such as a hot spot, and a liquid crystal display device equipped with the liquid crystal display device.

2. Background of the Related Art

With recent developments in various portable electronic apparatuses, such as a mobile phone, a PDA, and a notebook computer, demand has increased for small-sized, small-thickness, lightweight flat panel display devices that are applicable to such electronic apparatuses. Research has been actively done on the flat panel display devices, such as a liquid display panel (LCD), a plasma display panel (PDP), a field emission display (FED), and a vacuum fluorescence display (VEF). But, the LCD is currently in wide use due to advantages such as availability of mass production technology, ease of operation of a driving unit and easier realization of an high-quality image and a large-sized screen.

The liquid crystal display device is a transmission type display device, and a desired image is displayed on the liquid crystal display device by adjusting an amount of light that penetrates a layer of liquid crystal using refractive index anisotropy of a liquid crystal molecule. Therefore, a backlight unit, a source of light that penetrates the layer of liquid crystal is provided in the liquid crystal display device for displaying an image. The backlight unit is broadly divided into two types.

One type is an edge-light backlight unit in which a lamp is installed to a side face of a liquid crystal panel and provides light to the layer of liquid crystal. The other type is a direct-light backlight unit in which a lamp provides light directly from under the liquid crystal panel.

The edge-light backlight unit is installed on a side face of the liquid crystal panel and supplies light to the layer of liquid crystal through a reflector and a light guide plate. The use of the edge-light backlight unit makes it possible to make the liquid crystal panel small in thickness. Thus, the edge-light backlight unit is widely used for a notebook computer and the like that needs a display device with a small thickness.

The direct-light backlight unit supplies light, which is emitted from the lamp, directly to the layer of liquid crystal. For this reason, the direct-light backlight unit can be applied to a large-sized liquid crystal panel and can realize high luminance. Thus, recently, the direct-light backlight units have been in wide use for manufacturing liquid crystal panels for LCD.

FIG. 1 is a diagram schematically illustrating a construction of the liquid crystal display device equipped with the edge-light backlight unit.

As illustrated in FIG. 1, a liquid crystal display device 1 is mainly arranged to include a liquid crystal display panel 40 and a backlight unit 10 that is installed under the liquid crystal panel 40 to supply light to the liquid crystal panel 40. The liquid crystal panel, in which an image is actually realized, is configured to include a first substrate 50 and a second substrate 45 that are transparent like glass, and a layer of liquid crystal (not illustrated) formed between the first substrate 50 and the second substrate 45. Specifically, although not illustrated, the first substrate 50 may be a TFTG substrate on which drive elements such as thin film transistors and pixel electrodes are formed, and the second substrate 45 may be a color filter substrate on which a color filter layer is formed. In addition, a drive circuit unit 5 is provided to the side face of the first substrate 50 and applies signals to the thin film transistors and the pixel electrodes, respectively.

The backlight unit 10 is configured to include lamps 11, a light guide panel 13, a reflector 17, and an optical sheet. The lamps actually emit light. The light guide panel 13 guides the light emitted from the lamps 11 toward the liquid crystal panel 40. The reflector 17 reflects the emitted light toward the light guide plate 13 to improve optical efficiency. The optical sheet includes a diffusion sheet 15 and a prism sheet 20 and is arranged over the light guide plate 13.

In the backlight unit 10 with the configuration described above, light emitted from the lamps 11 installed in both side faces of the light guide plate 13, respectively, is incident on a side face of the light guide plate 13, and the incident light is transmitted from an upper surface of the light guide plate 13 to the optical sheet, is improved by the optical sheet in terms of optical efficiency, and then is supplied to the liquid crystal panel 40.

The light transmitted from the light guide plate 13 is incident on the diffusion sheet 15 and the prism sheet 20 that are included in the optical sheet. After the diffusion sheet 15 diffuses the light, the prism sheet 20 causes the diffused light to propagate toward the liquid crystal panel 40.

Polarizers 5a and 5b are arranged on a lower surface and an upper surface of the liquid crystal panel 40, respectively. The light emitted from the backlight unit 10 is polarized in the first polarizer 5a that is attached to the first substrate 50 and a polarized state of the light is changed while the light penetrates the layer of liquid crystal. Thereafter, the light is transmitted to outside of the liquid crystal display device 1 through the second polarizer 5b attached to the second substrate 45. At this point, an image is realized by adjusting light transparency of the second polarizer 5b according to the polarized state of the light in the layer of liquid crystal.

The lamp 11 is formed in one side face or opposite side faces of the light guide plate 13. Light emitted from the lamp 11 is incident on an incident-light side face of the light guide plate 13 that faces toward the lamp 11. When an angle of the light incident on an upper surface or a lower surface of the light guide plate 13 is below a threshold angle, the light is totally reflected and propagates one side face of the light guide plate 13 to the opposite side face. When the angle of the light incident on the upper surface or the lower surface of the light guide plate 13 is the threshold angle or above, the light is transmitted to outside of the light guide plate 13 and is reflected by the reflector 17, or is transmitted from the upper surface of the light guide plate 13 and is applied to the liquid crystal panel 40.

Since the edge-light backlight unit in which the lamp 11 is arranged to the side face of the light guide plate 13 is installed to a side face of the liquid crystal panel, it is possible to make the backlight unit relatively small in thickness. This leads to realizing a display device that is small in thickness.

In the edge-light backlight unit, the light emitted from the lamp 11 has to be uniformly scattered in order that the light which produces uniform luminance may be supplied from the light guide plate 13 to the liquid crystal panel 40. For scattering the light, predetermined patterns are formed on the upper surface or the lower surface of the light guide plate 13. The patterns are formed in an embossed or engraved shape using a screen printing method, a molding method, a V-cutting method or the like.

However, the method described above, in which the light to be supplied to the liquid crystal panel 40 is scattered using the patterns formed on the upper surface or the lower surface of the light guide plate 13, has the following problem. That is, the light incident on the incident-light side face of the light guide plate 13 is reflected from the upper surface or the lower surface of the light guide plate 13, is guided from the incident-light side face to the opposite side face, is transmitted from the upper surface of the light guide plate 13 and is supplied to the liquid crystal panel 40. However, because the light incident on the patterns on the upper surface or the lower surface of the light guide plate 13 is scattered by the patterns and are transmitted, the problem of decreasing optical efficiency and thus luminance of the liquid crystal display device occurs.

SUMMARY OF THE INVENTION

Accordingly, the present invention is directed to a light guide plate having a rounded polygon pattern and a liquid crystal display device having the same that substantially obviates one or more problems due to limitations and disadvantages of the related art.

An advantage of the present invention is to provide a light guide plate, on whose lower surface light converging patterns in the shape of a wedge are formed to converge light reflected from the lower surface in a specific direction and thus to improve luminance, and a backlight unit equipped with the light guide plate.

Another advantage of the present invention is to provide a light guide plate, on whose lower surface light converging patterns are formed to be rounded in such a manner that light reflected from the upper surface is spread out between the adjacent light converging patterns and thus the light producing uniform luminance is supplied to a liquid crystal panel, and a backlight unit.

A further advantage of the present invention is to provide a liquid crystal display device equipped with the backlight unit having the configuration described above. To achieve these and other advantages and in accordance with the purpose of this specification, as embodied and broadly described herein, there is provided a light guide plate including: a main body for guiding incident light and transmits the incident light from an upper surface of the main body; and a plurality of light converging patterns in a rounded wedge shape having a rounded upper surface on a lower surface of the main body to converge and reflect the incident light in the predetermined direction.

In the light guide plate, a side face of the wedge-shape light converging pattern may be formed in a manner that makes an acute angle with a base of the light converging pattern or is formed in a manner that is normal to the base.

To achieve these and other advantages and in accordance with the purpose of this specification, as embodied and broadly described herein, there is provided a backlight unit including: a light source; a light guide plate for guiding light from the light source; and a plurality of light converging patterns in a rounded wedge shape having a rounded upper surface on a lower surface of light guide plate to converge and reflect the incident light in a predetermined direction.

A diffusion sheet that diffuses the light that is transmitted from the light guide plate, a first prism sheet that is arranged over the diffusion sheet and converges the light diffused from the diffusion sheet in a first direction, and a second prism sheet that is arranged over the first prism sheet and converges the light diffused from the diffusion sheet in a second direction may be arranged on the upper surface of the light guide plate, and an inclination of an upper surface of the light converging pattern with respect to a base of the light converging pattern may be determined an angle may be determined by a prism on the first prism sheet or the second prism sheet.

To achieve these and other advantages and in accordance with the purpose of this specification, as embodied and broadly described herein, there is provided a liquid crystal display device including: a liquid crystal panel; a light source; a light guide plate for guiding light t from the light source; and a plurality of light converging patterns in a rounded wedge shape having a rounded upper surface on a lower surface of light guide plate to converge and reflect the incident light in the predetermined direction.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE ILLUSTRATED EMBODIMENTS

Figure 1:
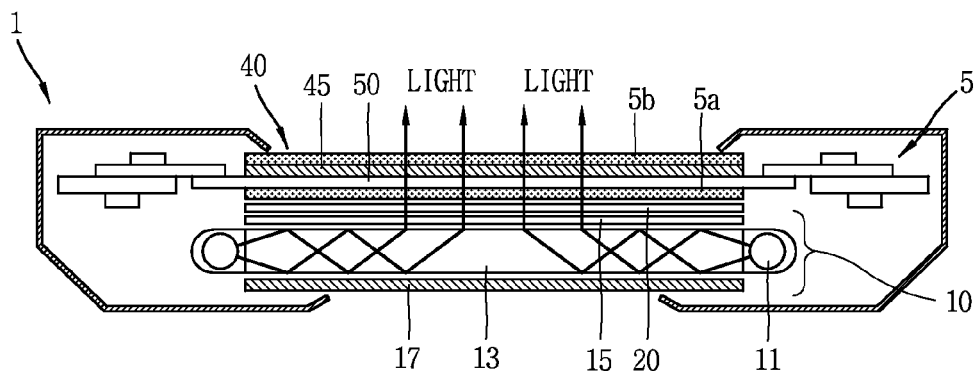
FIG. 1 is a liquid crystal display device in the related art.

Description will now be given in detail of the exemplary embodiments, with reference to the accompanying drawings. For the sake of brief description with reference to the drawings, the same or equivalent components will be provided with the same reference numbers, and description thereof will not be repeated.

A light guide plate according to the present invention is described in detail below referring to the drawings.

Figure 2:
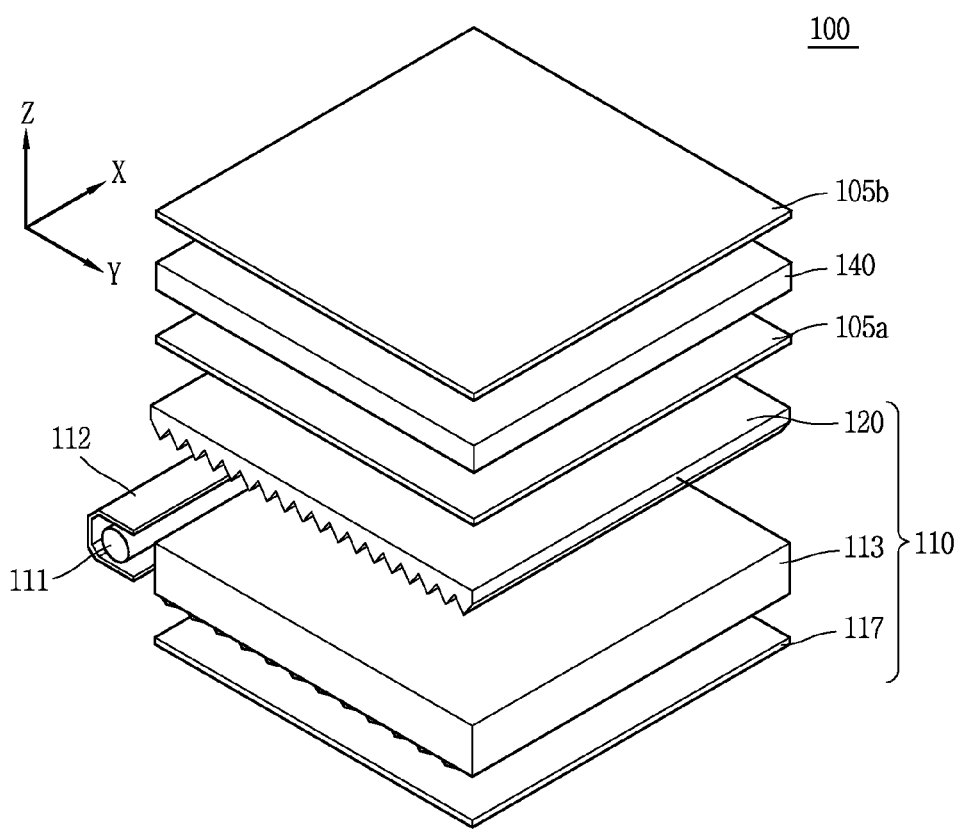
FIG. 2 is a perspective exploded diagram of a liquid crystal display device according to the present invention.
Figure 3:
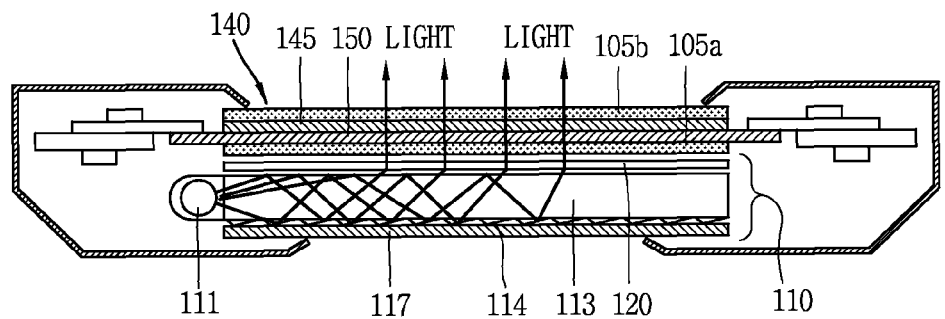
FIG. 3 is a cross-sectional diagram of the liquid crystal display device according to the present invention.

FIG. 2 is a perspective exploded diagram illustrating construction of a liquid crystal display device according to the present invention. FIG. 3 is a cross-sectional diagram of the liquid crystal display device.

As illustrated in FIGS. 2 and 3, a liquid crystal display device 100 is arranged to include a liquid crystal panel 140, and a backlight unit 110. In this configuration, the backlight unit 110 is positioned under the liquid crystal panel 140 and supplies light to the liquid crystal panel 140.

The backlight unit 110 is configured to include a light source 111, a light guide plate 113, a reflector 117, and an optical sheet including a prism sheet 120. Light that is emitted from the light source 111 is supplied to the liquid crystal panel 140. The light guide plate 113 is arranged under the liquid crystal panel 140 in such a manner that one side face of the light guide plate 113 comes into contact with the light source 111. The light guide plate 113 supplies the light that is incident on the one side face of the light guide plate 113 from the light source 111, to the liquid crystal panel 140. The reflector 117 is arranged below is arranged under the light guide plate 113. The reflector 117 reflects the incident light from under the light guide plate 113, toward the liquid crystal panel 140. The prism sheet 120 with a plurality of a plurality of prisms arranged in one direction, is arranged between the light guide plate 113 and the liquid crystal panel 140. The prism sheet 120 totally reflects the incident light from the light guide plate 113 in the forward direction and supplies the light to the liquid crystal panel 140.

In addition, a first polarizer 105a and a second polarizer 105b are attached to an upper surface and a lower surface of the liquid crystal panel 140, respectively.

Figure 4:
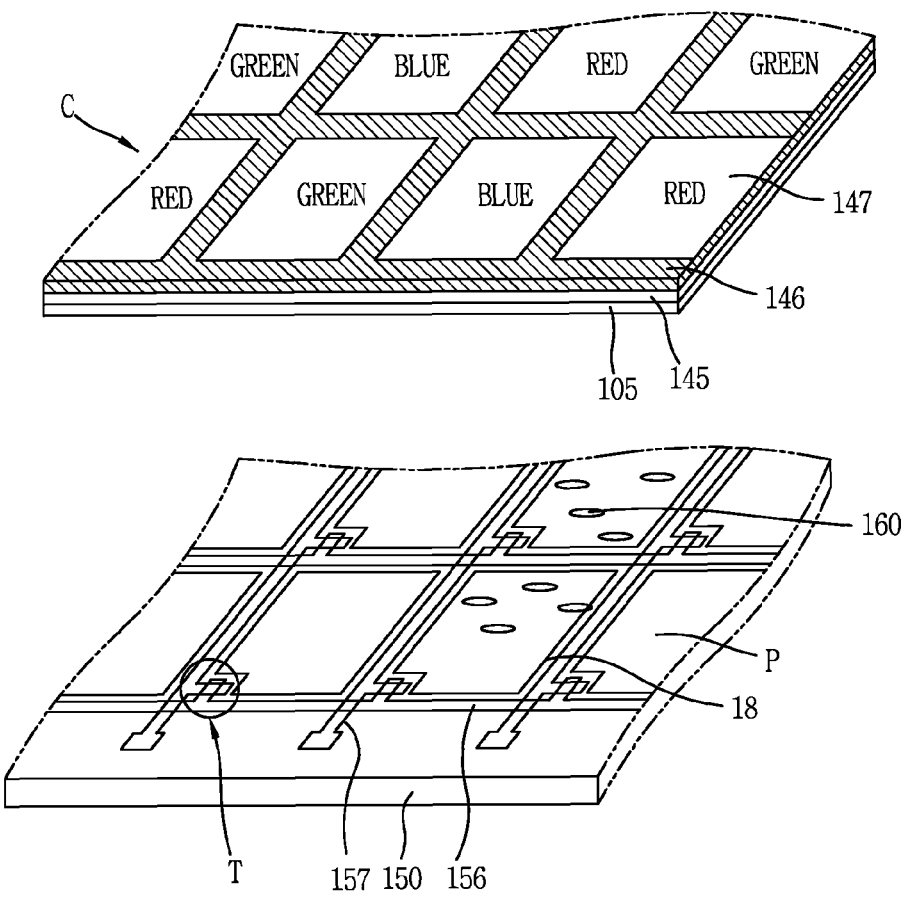
FIG. 4 is a perspective diagram illustrating a construction of a liquid crystal panel according to the present invention.

As illustrated in FIG. 4, the liquid crystal panel 140 is configured from a first substrate 150, a second substrate 145, and a layer of liquid crystal (not illustrated) between them. A plurality of gate lines 156 and data lines 157 are arranged in a matrix on the first substrate 150, thereby defining a plurality of pixel areas P. A thin film transistor T and a pixel electrode 158 that is connected electrically to the thin film transistor are formed in each pixel area P. A gate pad and a data pad are formed on end portions of the gate line 156 and the data line 157, respectively. The gate pad and the data pad connect the gate line 156 and the data line 157, respectively, to an external drive element. Thus, an external signal is input through the gate line 156 and the data line 157.

Although not illustrated, the thin film transistor T is configured to include a gate electrode, a gate insulation layer, a semiconductor layer, a source electrode, and a drain electrode. The gate electrode is connected to the gate line 156. Through the gate line 156, a scan signal is input into the gate electrode from outside. The gate insulation layer is formed over the gate electrode. The semiconductor layer is formed on the gate insulation layer. When the scan signal is input in the gate electrode, the semiconductor layer is activated and forms a channel. The source electrode and the drain electrode are formed on the semiconductor layer. The channel is formed on the semiconductor layer, and an image signal that is input through the data line 157 is applied to the pixel electrode 158 through the source electrode and the drain electrode.

A black matrix 146 and a color filter layer 147 are formed on the second substrate 145. The black matrix 146 is formed on an image non-display area that an image is not directly involved in creating an image, such as the gate line 156, the data line 157, or an area where the thin film transistor T is formed. Thus, the black matrix 146 prevents light from passing through the image non-display area and degrading image quality. The color filter layer 147 is configured to include sub-layers of R (red), G (green), and B (blue) color filters that are directly involved in creating the image. Each pixel has a color filter of one of the three primary colors (red, green, and blue).

The layer of liquid crystal (not illustrated) is formed between the first substrate 150 and the second substrate 145 that are configured as describe above, thereby resulting in forming the liquid crystal panel 140. A polarizer 105 (FIG. 3) is attached to the second substrate 145 of the liquid crystal panel 140.

A fluorescent lamp, such as a cold cathode fluorescent lamp, is used as the light source 111. A reflective layer is formed on the inside surface of a housing 112 that accommodates the light source 111. Thus, the inside surface reflects the light emitted from the light source 111 toward the light guide plate 113. In addition, the light source 111, as illustrated in FIG. 3, may be formed on only one side face of the light guide plate 113 or may be formed on opposite side faces of the light guide plate, in which case the light emitted from the light source 111 is incident on both of the side faces of the light guide plate 113.

A light emitting device, as well as the fluorescent lamp, is used as the light source 111. Because the LED is self light emitting that emits light and emits monochromatic light of R, G, and B, the LED, when applied to the backlight unit, has an advantage that a color reproduction rate is high and power consumption for driving is reduced.

If a LED is used as a light source 111 for the backlight unit, light emitted from the LED is not supplied as monochromatic light, but supplied as white light, to the liquid crystal panel. A monochromatic light emitting element and a fluorescent substance are used, an element emitting light in the infrared range and the fluorescent substance are used, or monochromatic light of R, G, and B emitted from the light emitting element is mixed in order to produce white light from monochromatic light that is emitted the light emitting element. That is, if the LED is used as the light source 111 for the backlight unit, a plurality of LEDs are arranged on the side face of the light guide plate 113 to input white light or monochromatic light into the light guide plate 113.

The prism sheet 120, obtained by regularly forming a plurality of prisms, each being made of acrylic-based resin, on a base film made mainly of polyethylene terephthalate (PET), refracts the incident light and thus enables the light to propagate in the forward direction. At this point as illustrated in the drawings, since the prisms on the prism sheet 120 are arranged in one direction, that is, in the X-direction, the prisms totally reflect the light that propagates from an incident-light side face of the light guide plate 113 to the opposite side face and then is transmitted at a constant angle from an upper surface of the light guide plate 113, in such a manner that the light is vertically incident on the liquid crystal panel 140.

In addition, since the prisms are formed on a lower surface of the prism sheet 120 and thus are arranged in such a manner that apexes of the prisms face toward the light guide plate 113, the prisms totally reflects the light that is incident at a constant angle on the upper surface of the light guide plate 113, toward the upper surface of the liquid crystal panel 140.

If the prisms are formed on an upper surface of the prism sheet 120 in such a manner that the apexes of the prisms face toward the liquid crystal panel 140, the light emitted from the light guide plate 113 are not totally reflected from the prisms on the prism sheet 120, but is refracted into the prisms and is supplied to the liquid crystal panel 140. Because of this, only the light that is incident at a specific angle on the prism is refracted, and the light that is incident at a different angle on the prism is not refracted. Thus, the construction in which the prisms are formed on the upper surface of the prism sheet is lower in optical efficiency than the construction in which the prisms are formed on the lower surface of the prism sheet.

In addition, the construction in which the prisms are formed on the lower surface of the prism sheet does not need a separate optical sheet. Thus, the manufacturing cost is reduced.

The light incident on the side face of the light guide plate 113 propagates toward the opposite side face of the light guide plate 113, is emitted through the upper surface of the light guide plate 113, and is supplied to the liquid crystal panel 140. At this time, as illustrated in FIG. 3, a pattern 114 is formed on a lower surface of the light guide plate 113, and thus light incident on the pattern 114 is reflected and transmitted from an upper surface of the light guide plate 113.

Figure 5A:
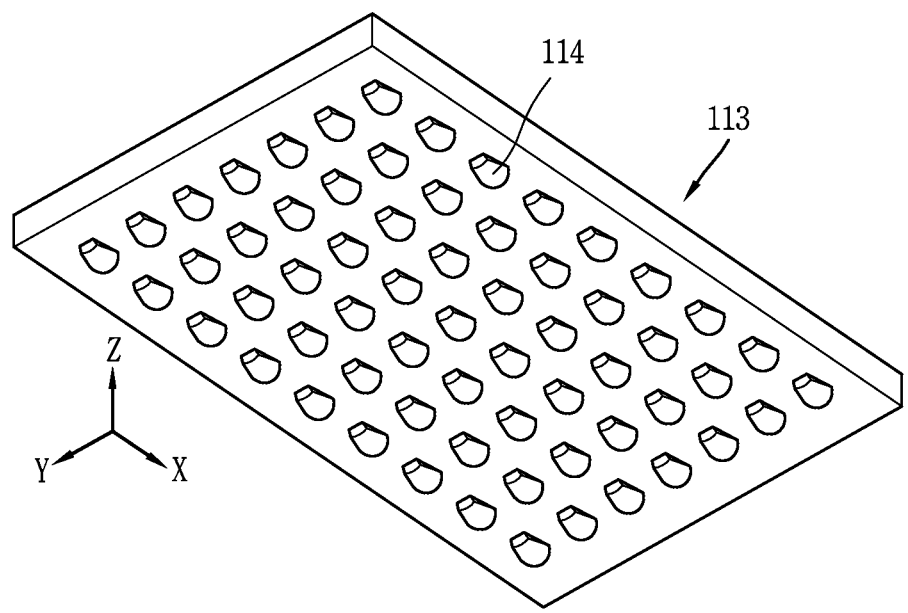
FIG. 5A is a perspective diagram illustrating a construction of a light guide plate according to the present invention.
Figure 5B:
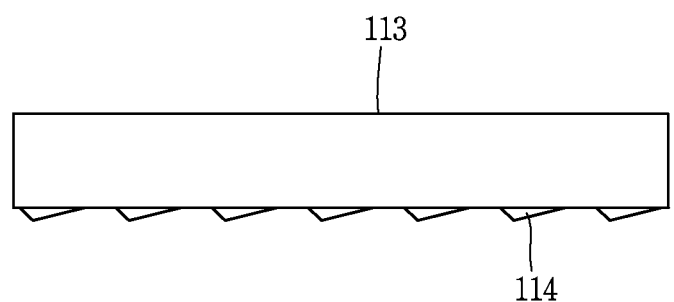
FIG. 5B is a cross-sectional diagram illustrating the construction of the light guide plate according to the present invention.

FIG. 5A is a perspective diagram illustrating a construction of the light guide plate 113 according to the present invention. FIG. 5B is a cross-sectional diagram illustrating the light guide plate in FIG. 5A.

As illustrated in FIGS. 5A and 5B, the light guide plate 113 is made of a material, such as polymethyl-methacrylate (PMMA), glass, or polyethylene terephthalate (PET). The light guide plate 113 is formed in the shape of a rectangle. A plurality of light converging patterns 114 are formed on a rear surface of the light guide plate 113, that is, on the lower surface of the light guide plate 113, which is opposite to the upper surface that face toward the liquid crystal panel 140. The light converging pattern 114 reflects the light that is emitted from the light source 111 and then is incident on the light converging pattern 114 through the incident-light side face of the light guide plate 113, and at the same time converges the incident light in a given direction.

A shape and a size of the light converging pattern 114, a distance between the adjacent light converging patterns 114, the number of the light converging patterns 114, and the like are determined according to an area of the light guide plate 113, an angle of the light that is reflected from the upper surface of the light guide plate 113 and then is incident on the light converging pattern 114, and the like. In the drawings, the light converging patterns are regularly formed on the lower surface of the light guide plate in such a manner that they are spaced given distances relative to one another. However, the light converging patterns may be irregularly formed in such a manner that they are spaced different distances relative to one another.

The light converging pattern 114 is made of the same material as the light guide plate 113, such as polymethyl-methacrylate (PMMA), glass, or polyethylene terephthalate (PET). The light converging patterns 114 may be formed integrally with the light guide plate 113, but may also be formed separately from the light guide plate 113 and attached to the lower surface of the light guide plate 113. If the light converging patterns 114 are formed separately from the light guide plate 113 and are attached to the lower surface of the light guide plate 113, the light converging patterns 114 may be made of the same material as the light guide plate 113 and be made of the different material than the light guide plate 113.

Figure 6A:
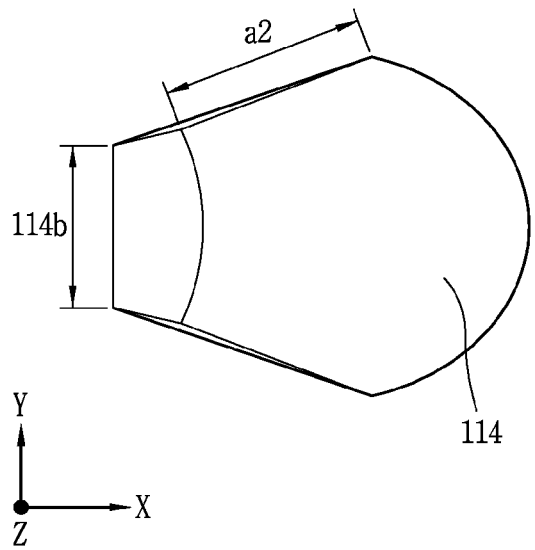
FIGS. 6A to 6C are diagrams illustrating a construction of a light converging pattern according to the present invention.
Figure 6B:
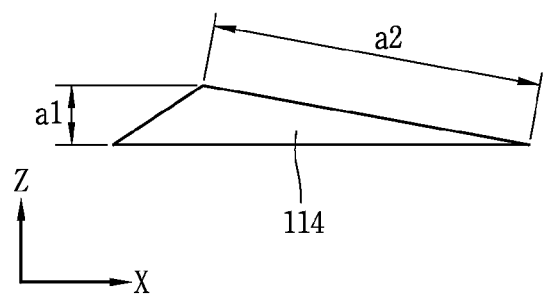
Figure 6C:
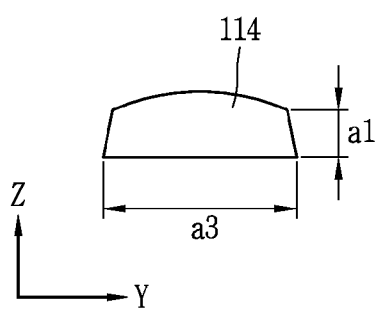

FIG. 6A is a perspective diagram illustrating a construction of the light converging pattern 114 that is formed on the lower surface of the light guide plate 113. FIG. 6B is a cross-sectional diagram illustrating the light converging pattern 114 when viewed from the Y-direction. FIG. 6C is a cross-sectional diagram illustrating the light converging pattern 114 when viewed from the X-direction.

As illustrated in FIG. 6A, the light converging pattern 114 is configured to take on the shape of a wedge. That is, the base of the light converging pattern is in the shape of a polygon of which sides are a2 and a3 in length, and the light converging pattern is the shape of a wedge of which heights are a1 and 0.

In this manner, the light converging pattern 114 is formed in such a manner that the height from one end of the base is a1 and the height from the other end of the base is 0. As illustrated in FIG. 6B, an upper surface of the light converging pattern 114 is formed in such a manner that it is inclined from a1 to the base of the light converging pattern along the X-direction. Thus, when light that is incident on the light converging pattern 114 through the incident-light side face of the light guide plate 113 is reflected from the upper surface of the light converging pattern 114, the light is reflected in such a manner that the light is converged in a specific direction due to the inclination of the upper surface with respect to the base. In addition, as illustrated in FIG.

6C, the upper surface of the light converging pattern 114 is rounded. That is, the upper surface is rounded like a line that is curved due to a constant curvature along the Y-direction.

As illustrated in the drawings, one side face of the light converging pattern 114 is formed to the height a1 in a manner that makes an acute angle with the base, but the one side face may be formed in such a manner that it is vertical to the base.

According to the present invention, as described above, the light converging pattern 114 is formed in order to converge light, supplied from the light guide plate 113 to the liquid crystal panel 140, in a specific direction and thus to improve luminance of the liquid crystal display device. This is described in more detail below.

According to the present invention, if the prisms are formed on the lower surface of the prism sheet 120 and thus the apexes are formed in manner that faces toward the light guide plate 113, light that is transmitted from the light guide plate 113 and is incident on the prism sheet 120 is totally reflected from the prisms on the prism sheet 120. At this point, since the prisms are formed at a constant angle on the prism sheet 120, the incident angle of light that is incident on the prism sheet 120 has to be the same in order to totally reflect all light that is transmitted from the light guide plate 113 and thus to maximize luminance produced by the light that is supplied to the liquid crystal panel 140.

Figure 7A:
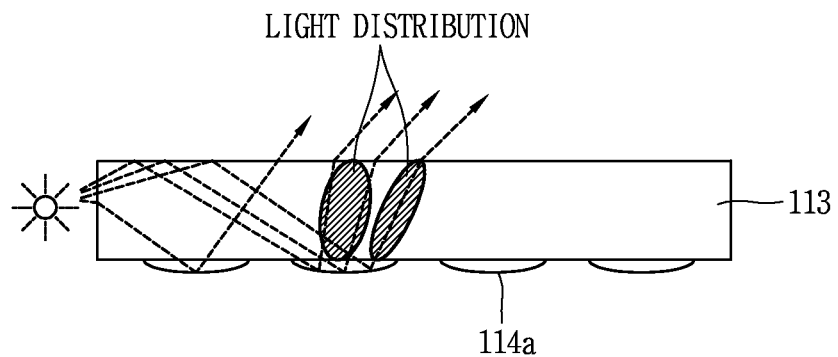
FIG. 7A is a diagram illustrating distribution of reflected light in the case of a print pattern that is formed on a lower surface of the light guide plate.

As illustrated in FIG. 7A, if a pattern 114a is formed like a circle-shaped print pattern using a printing technique or a laser, the patterns 114 do not provide directionality. Because of this, light that is incident on the pattern 114a through the incident-light side face of the light guide plate 113 is not reflected from the print pattern 114a in a desired direction. As a result, the light that is transmitted from the light guide plate 113 and is incident on the prism sheet 120 is at a constant angle.

Figure 7B:
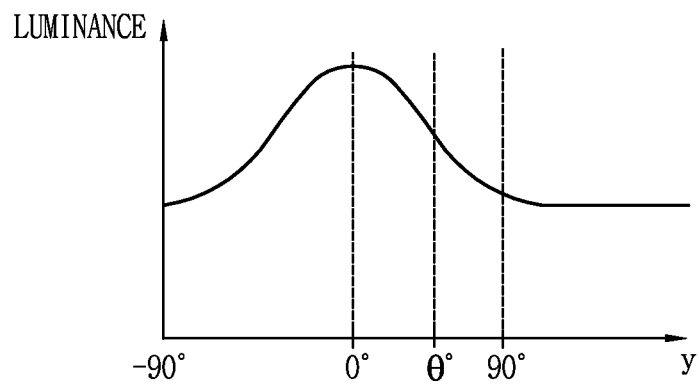
FIG. 7B is a graph illustrating luminance produced by light that is transmitted from the light guide plate if the print pattern is formed.

FIG. 7B is a diagram illustrating the luminance produced by light that is supplied to the liquid crystal panel 140 when the print pattern 114a is formed on the lower surface of the light guide plate 113. In FIG. 7B, a direction vertical to the upper surface of the light guide plate 113 is expressed as 0°. As illustrated in FIG. 7B, the luminance produced by the light that is transmitted from the light guide plate 113 on which the print pattern 114a is the highest in the 0° direction, that is, when the transmitted light is vertical to the upper surface of the light guide plate 113. As an angle with the upper surface of the light guide plate 113 is increased, the luminance is decreased. That is, the light that is transmitted from the light guide plate 113 on which the print pattern 114a is formed is scattered without being converged in one direction (for example, in an angle θ direction, and is reflected in many directions. This imposes limitation on improving the luminance.

Figure 7C:
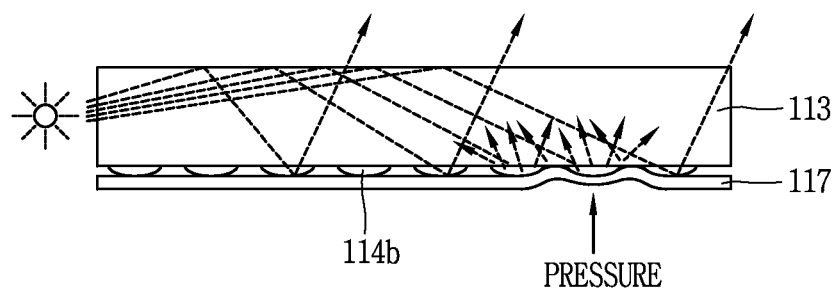
FIG. 7C is a diagram illustrating that if a lens-shaped pattern is formed on the lower surface of the light guide plate, a wet phenomenon occurs due to pressure.

In addition, as illustrated in FIG. 7C, if the pattern 114b in the shape of a lens is formed on the lower surface of the light guide plate 113, when pressure is applied from outside, a wet phenomenon occurs where the reflector 117 under the light guide plate 113 is attached to the lower surface of the light guide plate 113. Such wet phenomenon removes air space between the light guide plate 113 and the reflector 117. Thus, when the light is reflected from a surface of the pattern 114b, the light is reflected by a difference in refractive index between the pattern 114b and the reflector 117, not by the difference in refractive index between the pattern 114b and the air space. Because of this, the light is randomly reflected from the surface of the pattern 114b without being refracted into the surface of the pattern 114b in a constant direction. Accordingly, there is limitation on improving the luminance of the liquid crystal panel 140.

Figure 8A:
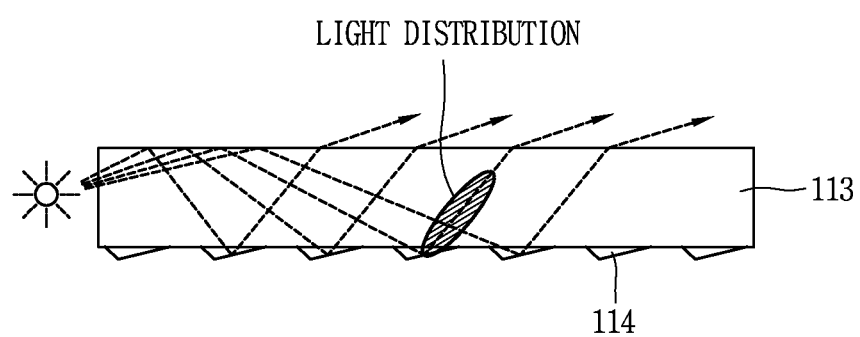
FIG. 8A is a diagram illustrating the distribution of the reflected light in the case of the light converging pattern that is formed on the lower space of the light guide plate according to the present invention.

However, as illustrated in FIG. 8A, according to the present invention, the light converging pattern 114 in the shape of the wedge of which the upper surface is inclined at a constant direction is formed on the lower surface of the light guide plate 113. Thus, the light that is incident on the light converging pattern 114 through the incident-light side face of the light guide plate 113 is reflected from the upper surface of the light converging pattern 114 in a constant direction. At this time, a reflection angle of the light varies according to the inclination of the upper surface of the light converging patter 114 and the refractive index of the light converging pattern 114.

Figure 8B:
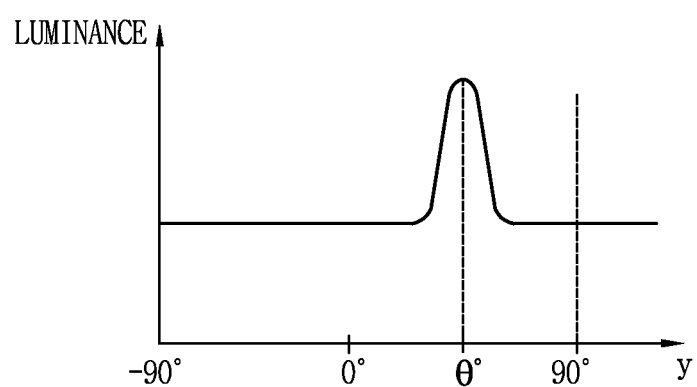
FIG. 8B is a graph illustrating the luminance produced by the light that is transmitted from the light guide plate including lower surface having light converging pattern.

FIG. 8B is a graph illustrating the luminance produced by the light that is transmitted from the light guide plate 113, on whose lower surface the light converging pattern 114 is formed. At this time, angles of the light guide plate 113 are indicated on an X-axis. An angle vertical to the upper surface of the light guide plate 113 is expressed as 0° and a horizontal direction with respect to the upper surface is expressed as −90° and 90°.

As illustrated in FIG. 8B, because the upper surfaces of a plurality of light converging patterns 114 arranged on the lower surface of the light guide plate 113 are all inclined at the same angle in the same direction, the light that is reflected from each of the light converging patterns 114 is transmitted in the same angle θ direction. Thus, the luminance in the angle θ direction is far higher than that in the other directions.

The prism sheet 120 is arranged on the upper surface of the light guide plate 113. At this point, the prism to be on the prism sheet 120 is designed according to the refractive index of the light converging pattern on the light guide plate 113 and the inclination of the upper surface. The light that is reflected from the light converging pattern 114 and is converged is refracted into the prism on the prism sheet 115 and is supplied to in front of the liquid crystal panel 140.

In addition, the reason for rounding the light converging patterns 114 according to the present invention is described in detail below.

Figure 9A:
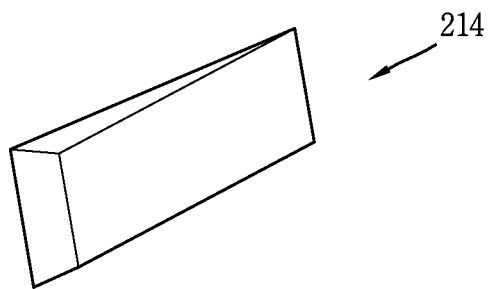
FIGS. 9A to 9C are diagrams illustrating the construction of the light converging pattern of which an upper surface is flat.
Figure 9B:
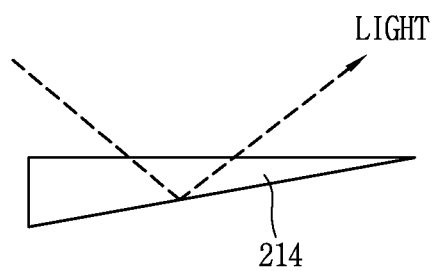
Figure 9C:
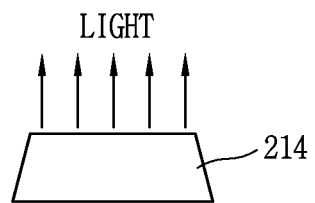
Figure 10A:
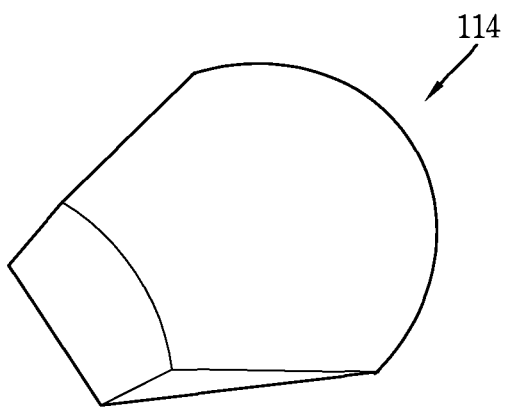
FIGS. 10A to 10C are diagrams illustrating the construction of the light converging pattern of which the upper surface is rounded.
Figure 10B:
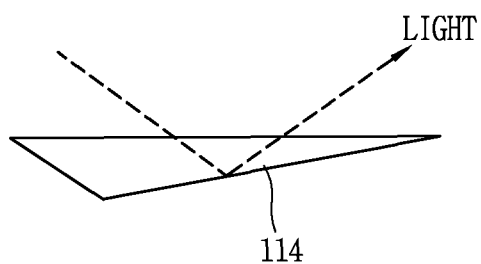
Figure 10C:
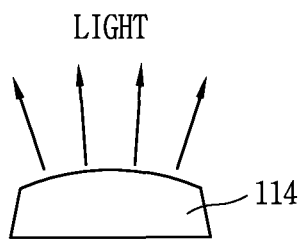

FIGS. 9A to 9C are diagrams illustrating a light converging pattern 214 of which an upper surface is not rounded. FIGS. 10A to 10C are diagrams illustrating the light converging pattern 114 of which the upper surface is rounded, according to the present invention.

Referring to FIGS. 9A to 9C and FIGS. 10A to 10C, when the light converging pattern 214 with a construction illustrated in FIGS. 9A to 9C is compared with that of the light converging pattern 114 on the light guide plate 113 according to the present invention, basic specifications for construction, such as distribution of patterns on the lower surface of the light guide plate, an area of the lower surface of the pattern, a height of the pattern, an inclination of the upper surface of the pattern, and the like are all the same except for only a shape of the upper surface of the pattern.

That is, whereas the light converging pattern 214 with the construction illustrated in FIGS. 9A to 9C has the flat upper surface, the light converging pattern 114 has the upper surface that is rounded like a curved line. Accordingly, light is reflected in the same direction from the upper surface of the light converging pattern 214 as from the upper surface of the light converging pattern 114 according to the present invention. The luminance produced by the light reflected from the upper surface of the converging pattern 214, like the luminance produced by the light reflected from the upper surface of the converging pattern 114, is the highest in a specific direction (an angle θ) (refer to FIG. 8B).

Figure 11A:
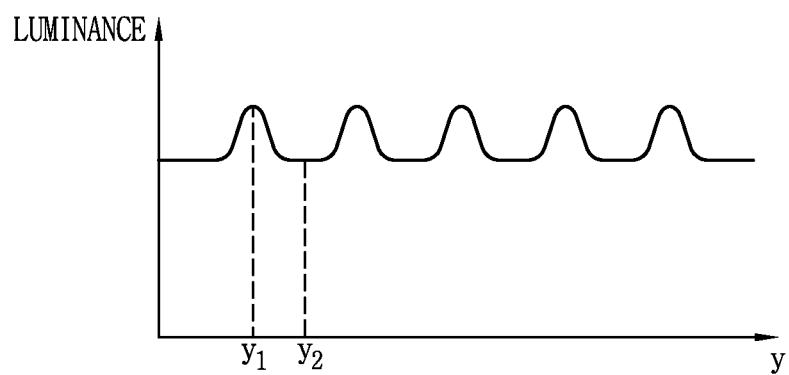
FIG. 11A is a graph illustrating the luminance produced by the light that is transmitted from the light guide plate to which the light converging pattern of which the upper surface is flat is provided.

However, an upper surface of the light converging patter 214 with the configuration illustrated in FIGS. 9A to 9C is formed at a constant inclination. Thus, in the X-direction, the light is converged in a specific angle direction and, as illustrated in FIG. 9C, is reflected and at the same time is transmitted only in a direction vertical to the upper surface (that is, only in the Z-direction) without spreading out in the Y-direction. Therefore, if the light converging pattern 214 is applied to the light guide plate, as illustrated in FIG. 11A, the luminance is not uniform along the Y-direction of the light guide plate, and the difference in the luminance is great between a region y1 on which the light converging pattern 214 and a region y2 between the light converting patterns. Thus, a hot spot phenomenon occurs where a white spot appears on a screen, thereby degrading quality of the liquid crystal display device.

Figure 11B:
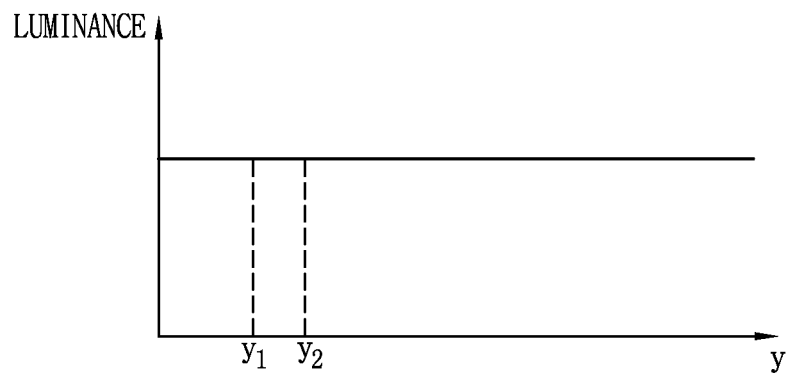
FIG. 11B is a graph illustrating the luminance produced by the light that is transmitted from the light guide plate to which the light converting pattern of which the upper surface is rounded is provided.

In contrast, the upper surface of the light converging pattern 114 on the light guide plate is also inclined at a constant inclination, and in the X-direction, the light is converged in a specific angle direction and is reflected, and at the same time, is not only transmitted only in a direction vertical to the upper surface, but also spreads out in the shape of a fan from the upper surface that is curved due to the curvature as illustrated in FIG. 10C. That is, the light is transmitted in the Y-direction as well. Therefore, if the light converging pattern 114 according to the present invention is applied to the light guide plate, light is not only transmitted in the direction vertical to the upper surface of the light guide plate 113, but also spreads out in the shape of a fan, reaching a region between the light converging patterns 114. Thus, pieces of light that are reflected from the adjacent light converging patterns 114 are mixed in the region between the light converging patterns 114, and are transmitted from the light guide plate 113. That is, in the case of the light converging pattern 114 according to the present invention, as illustrated in FIG. 11B, the region y1 on which the light converging pattern 114 is formed and the region y2 between the light converging patterns 214 are almost similar in luminance produced by the light. Thus, the light that produces the uniform luminance is supplied to the liquid crystal panel, thereby effectively preventing the hot spot from occurring the liquid crystal display device.

Therefore, the curvature of the upper surface of the light converging pattern 114 varies according to a distance between the light converging patterns 114. The curvature to which the upper surface of the light converging pattern 114 is curved is determined by a distance between the light converging patterns 114 and the like, not by a specific number.

Figure 12:
FIG. 12 is a cross-sectional diagram illustrating other construction of a light converging pattern according to the present invention.

On the other hand, the light converging pattern 114 has a convex upper surface, but the light converging pattern 114 may have a concave upper surface as shown in FIG. 12. Substantially, the shape of the upper surface of the light converging pattern 114 is not limited to a specific shape. Whatever shape of the light converging pattern 114 from which light is transmitted not only in the upward direction, but spreads out also in the Y-direction may be possible.

As described above, according to the present invention, the light converging pattern in the shape of a wedge is formed on the lower surface of the light guide plate, but the upper surface of the light converging pattern is formed to be rounded. Thus, light is converged in the X-direction and at the same time, spreads out in the Y-direction, thereby transmitting uniform light from the light guide plate.

On the other hand, the backlight unit including the light guide plate and the liquid crystal display device are described above in terms of a specific construction, the present invention is not limited to the backlight unit and the liquid crystal display device. According to the present invention, as long as the light converging pattern in the shape of a wedge, of which the upper surface is rounded, is arranged on the lower surface of the light guide plate, whatever shape of the light converging plate, the backlight unit, the liquid crystal display device may be applicable.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A light guide plate comprising:
    a main body guiding light incident through an incident-light side face and transmitting the incident light from an upper surface of the main body; and
    a plurality of light converging patterns in a rounded wedge shape, each of the plurality of light converging patterns including two planar side surfaces extended downward from a lower surface of the main body and a reflecting surface directly extended from a flat base of the light converging pattern between lower edges of the two planar side surfaces and inclined in a light transmitting direction, a height of one end point of the reflecting surface being a1 and a height of an other end point of the reflecting surface being zero such that the planar side surface formed to the height a1 makes an acute angle with the base of the light converging pattern, to converge and reflect the incident light in a predetermined direction,
    wherein the reflecting surface between the lower edges of the two planar side surfaces includes a rounded portion,
    wherein the light is reflected at the rounded portion in a shape of a fan form so that the light reflected at the rounded portion of the light converging pattern is mixed with light reflected from neighboring light converging patterns to provide a uniform luminance in the predetermined direction.

2. The light guide plate of claim 1, wherein the two planar side surfaces of the plurality of light converging patterns form an acute angle with the lower surface of the main body or are vertical to the lower surface.

3. The light guide plate of claim 1, wherein the reflecting surface of the plurality of light converging patterns has a convex lens shape.

4. The light guide plate of claim 1, wherein the reflecting surface of the plurality of light converging patterns has a concave lens shape.

5. The light guide plate of claim 1, wherein a curvature of the rounded portion of the reflecting surface of the plurality of light converging patterns is determined according to a distance between the plurality of light converging patterns.

6. The light guide plate of claim 1, wherein the plurality of light converging patterns are formed integrally with the main body.

7. The light guide plate of claim 1, wherein the plurality of light converging patterns are formed separately from the main body and are attached to the lower surface of the main body.

8. A backlight unit comprising:
a light source;
a light guide plate guiding light through an incident-light side face from the light source; and
the light guide plate comprising:
a main body guiding light incident through the incident-light side face and transmitting the incident light from an upper surface of the main body; and
a plurality of light converging patterns in a rounded wedge shape, each of the plurality of light converging patterns including two planar side surfaces extended downward from a lower surface of the main body and a reflecting surface directly extended from a flat base of the light converging pattern between lower edges of the two planar side surfaces and inclined in a light transmitting direction, a height of one end point of the reflecting surface being a1 and a height of an other end point of the reflecting surface being zero such that the planar side surface formed to the height a1 makes an acute angle with the base of the light converging pattern, to converge and reflect incident light in a predetermined direction,
wherein the reflecting surface between the lower edges of the two planar side surfaces includes a rounded portion,
wherein the light is reflected at the rounded portion in a shape of a fan form so that the light reflected at the rounded portion of the light converging pattern is mixed with light reflected from neighboring light converging patterns to provide a uniform luminance in the predetermined direction.

9. The backlight unit of claim 8, further comprising:
a prism sheet disposed over the light guide plate to totally reflect light from the light guide plate so as to supply the reflected light to a liquid crystal panel.

10. The backlight unit of claim 9, wherein the prism sheet includes a plurality of prisms on a lower surface thereof, apexes of the plurality of prisms facing toward the light guide plate.

11. The backlight unit of claim 10, wherein an inclination of the reflecting surface of the plurality of light converging patterns with respect to the lower surface of the light guide plate is determined according to an angle of the plurality of prisms.

12. A liquid crystal display device comprising:
a liquid crystal panel;
a light source;
a light guide plate for guiding light through an incident-light side face from the light source; and
the light guide plate comprising:
a main body guiding light incident through the incident-light side face and transmitting the incident light from an upper surface of the main body; and
a plurality of light converging patterns in a rounded wedge shape, each of the plurality of light converging patterns including two planar side surfaces extended downward from a lower surface of the main body and a reflecting surface directly extended from a flat base of the light converging pattern between lower edges of the two planar side surfaces and inclined in a light transmitting direction, a height of one end point of the reflecting surface being a1 and a height of an other end point of the reflecting surface being such that the planar side surface formed to the height a1 makes an acute angle with the base of the light converging pattern, to converge and reflect incident light in a predetermined direction,
wherein the reflecting surface between the lower edges of the two planar side surfaces includes a rounded portion,
wherein the light is reflected at the rounded portion in a shape of a fan form so that the light reflected at the rounded portion of the light converging pattern is mixed with light reflected from neighboring light converging patterns to provide a uniform luminance in the predetermined direction.

* * * * *